Oct. 13, 1970   H. B. CUMMINGS ET AL   3,533,812
PROCESS FOR THE MANUFACTURE OF CERAMIC ARTICLES, AND
PRODUCT DERIVED FROM SUCH PROCESS
Filed Nov. 7, 1961

INVENTORS
HOWARD B. CUMMINGS
BY RALPH GIBSON

United States Patent Office 3,533,812
Patented Oct. 13, 1970

3,533,812
PROCESS FOR THE MANUFACTURE OF CERAMIC ARTICLES, AND PRODUCT DERIVED FROM SUCH PROCESS
Howard B. Cummings and Ralph Gibson, New Castle, Pa., assignors, by mesne assignments, to Interpace Corporation, Parsippany, N.J., a corporation of Delaware
Filed Nov. 7, 1961, Ser. No. 150,724
Int. Cl. B28b 1/26; C04b 33/22, 33/24
U.S. Cl. 106—39
34 Claims This invention relates to process for the manufacture of ceramic articles, and product derived from such process.

Clay has in many cases been an important ingredient in the manufacture of ceramic ware of all kinds. Clay, whether selected high grade or low grade, invariably has faced the technician with variant and many problems at almost every stage of the processing to produce ceramic ware. Solutions to such problems have been sought in the design of the apparatus, as well as in many variations in formulae and techniques. Clay provides a cheap source of alumina; natural clays have the property of plasticity in varying degree. While this last property is important in assuring that a formed piece retains the form imparted, yet the very property of plasticity introduces problems in handling the material such as to interfere with strength of the resultant piece and predictability of its properties. Problems arise during preparation, and during forming, and extend during handling of the article in the various stages after forming.

Clays, even from the same source, are unpredictable as to content. Clay lacks uniformity from its natural origin. Usually, in processing clay for various ceramic forming operations, the clay is, as it were, treated as having constant ingredients. Although clay generally is subjected to various steps to refine it or make it more workable, yet such treatment in many cases fails of its purpose to provide an ingredient of any uniformity. Likewise, for the manufacture of ceramic ware, other ingredients are intermixed with clay. For instance, sand, feldspar, or other ingredients may be used in such mixtures. In the mixtures thus made, dry or wet, and with clay binding the ingredients together, the ingredients still retain their individual porperties, their individual specific gravities, their tendencies to separate from the other ingredients, until the green piece has been formed and has been subjected to firing for fixing the form, as, for instance, by the production of vitrification in the fired piece. In this last stage, phase changes take place, both in a chemical as well as a physical sense. The nature and extent of these phase changes vary from one mixture to another. In many cases, variation is found even when mixtures are produced from the same formula, from the same raw materials.

For instance, it is well known that with clay as an ingredient in the mixture conventionally known as a "slip," production on a large scale requires that large numbers of molds must be available for use as each mold retains its own single product or casting over a long period of time in order that sufficient water be absorbed by the mold from the slip so as to permit removal of the "casting" from the mold for further working. While feeding the slip to the mold under high pressures results in unexpected gains over the results of feeding at ordinary pressures, molds still are required to retain castings over appreciable periods, and the castings thus derived, in some cases, have many of the defects found in the products of ordinary forming from mixtures containing clay.

Natural clay includes substantial portions of very fine particles. In cases where the forming is effected in molds, the walls of which absorb the liquid carrier of the solids from which the casting is being formed, that part of the slip within the mold cavity which is closest to the mold walls loses its carrier liquid first. The liquid carrier which is further removed from the walls of the mold cavity must then pass through the first densified particles which have already given up their liquid carrier to the mold walls. Further densification of the solid particles slows down, as does the entire process. Thus, it becomes difficult, even impossible, to determine if and when all of the liquid carrier has passed out of the "casting" into the mold walls. Indeed, even retention of the casting within the mold over a greatly extended period of time has been found insufficient to insure against a result to which reference will be made further, where actual cleavage results from layer formation in the casting.

In the usual methods of forming ceramic articles, after the formation from the slip or like medium, the formed article is set aside for drying. At this stage, and when the formed piece is positioned in the kiln and is heated, it has been found that the formed piece has a tendency to deform under its own weight. In many instances, it is found necessary to provide support for the formed piece in the kiln. For instance, sand is packed around the formed piece, or other means may be utilized to prevent the casting from collapsing as, for instance, as firing proceeds in the kiln.

Clay itself has water of crystallization. The formed piece retains substantial quantities of water concurrent to and to some extent by reason of the property of plasticity. Likewise, the natural clays always have present important quantities of organic and other oxidizable matter. All of these factors, and others which will be considered, result, as the temperature of the formed piece rises during firing, in the production of steam and gases which can and do, in many cases, result in deformation of the bisque, the product of firing the green formed piece. In many cases, this gas formation may result in complete destruction of the piece being fired. Cracks form; lines of weakness develop; strains and stresses are set up in the piece so that it may crack on the slightest impact, even long after the piece has been processed completely. The variant strengths found for different pieces derived from the same batch have made it necessary generally to design all pieces to have greater cross-sectional dimensions in order to assure a sufficient factor of safety for the strength of the finished product.

It is an object of the invention to provide a method of manufacture of ceramic ware in which, by the processing of the original ingredients at an initial stage, the inconsistent properties of clay are eliminated so as to be without any substantial effect during the final firing stage even though the relative cheapness of clay as a source of alumina and other ingredients, and of other desirable properties, are retained and utilized, indeed to the extent that, in many cases, it becomes unnecessary to be unduly selective as to the use of high grade, relatively more expensive clays for such articles as dinnerware of relatively high quality. Yet all of this is accomplished with reduction in the amount of ingredients necessary to form a casting or formed piece to derive a ceramic article of a desired strength, electrical properties, and other predictable physical properties.

It is an object of the invention to provide a process for manufacturing ceramic articles, and articles produced by such process, wherein clay forms at least an original ingredient, wherein the peak temperature necessary for producing a piece in the nature of that commonly known as the "bisque" may be reduced substantially, while producing an article relatively stronger, and more uniform in its components as determined by fracture, as well as capable of much greater accuracy in predetermination strength for a given cross-section, and with marked reduction in the number of manufactured pieces necessarily discarded during normal plant operation.

It is an object of the invention to provide a process of manufacturing ceramic articles, and the products of such process, wherein clay is used as an original ingredient, wherein the time necessary for the formation of a piece to its desired, substantially accurately dimensioned shape is substantially reduced so that equipment is released more quickly for successive uses, with resultant substantial reduction in the plant area necessary for a given production rate.

It is an object of the invention to provide a process in which clay is involved as an original ingredient for the production of ceramic articles, and the products of such process, in which are substantially eliminated, or reduced, in the final stages of forming and firing the formed piece, certain deterrent factors arising from properties of clay, from which follow, in such process products, much greater strength and control over dimensional characteristics, and thus reduction of required thickness of a piece for a necessary strength, as well as substantially uniform density of particles throughout the thickness of the formed piece, and wherein the absorption of the carrier liquid by a mold from a formed piece is not retarded by reason of any "clogged filter" action as the carrier liquid is removed from the formed piece by the walls of the forming means, such as a mold.

It is an object of the invention to provide a process wherein clay is involved as an original component of the materials for forming and producing a formed ceramic article, and the product of such a process, wherein clay is combined with other ingredients, and wherein, at the final stage of molding or forming, the ingredients have been merged by a reaction prior to the molding or forming so that a medium is provided for the subsequent steps of molding or forming, and the firing of such molded or formed pieces, for the production of articles with fairly definitely controlled properties, including predictable dimensional characteristics and reduction of a cross-section necessary to predict a desired structural strength, whereby it is made possible to produce ceramic ware of substantial uniformity, and wherein the properties of clay which normally would interfere with attaining any such results are substantially tamed or eliminated, and brought under positive control.

It is an object of the invention so to work, at an intermediate stage of the process, the ingredients entering into a process of producing ceramic ware involving the use of clay as an original ingredient, so that, in the stages of producing the bisque and in glazing, substantial reductions in temperatures are attained.

It is an object of the invention to eliminate to a substantial degree, and in a stage well in advance of the final forming and firing stages, the undesirable factors arising from properties of the ingredients of a ceramic molding mix, so that such undesirable properties of the ingredients will be incapable of having a deleterious effect during the final steps of producing a marketable product.

An end sought in making ceramic ware in which clay appears as an original ingredient is to reduce the temperatures necessary for the final stages of producing the bisque and glaze. Reduction of temperatures in both stages results not only in economies of fuel, but also in elimination of changes of phase of the components of the formed piece. For instance, it is known that, in some of these reactions, the form of the silica, present in the form of quartz, changes to cristobalite which introduces a factor of a substantial degree of expansion and contraction to the body which does not result at lower temperatures. These abrupt expansive changes place strain upon the body structure of the formed piece. By reduction of temperature to eliminate such phase changes, such factor which in the past has resulted in destruction of the formed pieces during and even after the bisque and glost fires, is substantially reduced, and even completely eliminated.

It is an object of the invention to provide a method of manufacturing ceramic ware, and the product of such process, wherein substantially the greater part of the variants involved in the use of clay as a molding material, in the chemical and physical changes resulting during the various stages of the usual processing, are reduced or eliminated, so that the final product is straighter, stronger, requires less material, is capable of a more esthetic appeal because of reduction in required thickness, and, during the final firing stages, requires less or no support.

It is an object of the invention to provide a process for the manufacture of ceramic ware wherefrom the product has greater uniformity throughout its section in physical, including electrical, properties. Since, as a result of such process, articles are derived which do have greater uniformity in their physical, including electrical, and chemical properties, it is possible to produce articles which, contrary to what has heretofore been accepted, are capable of being subjected to thermal conditioning, since the articles so produced have greater homogeneity, and final predictability in both dimensions and strength.

It is an object of the invention to provide a method of preparation of material for a final step of forming bodies for definitive and predictable product design, wherein the forming may be performed in a mold but one face of which is moisture absorbent, in order that, in the dimensions of the final product, reduction in dimensional tolerances results, and more accurately dimensioned articles are produced. It has been possible to produce articles by this method where the tolerances were reduced to less than ±0.002 inch. By means of a process involving the preparation of the material in the manner here described and the utilization of such material in a mold such as here to be considered, it has been found possible to operate on an assembly line basis.

It is an object of the invention to eliminate substantially or entirely the production of gases such as those derived from separation of water of crystallization and destruction of carbonaceous and other oxidizable materials, during the final firing stages and thus to eliminate the possible destructive effects of such gases upon the finally produced formed body, and thus to decrease not only the effective time necessary for completing a firing sequence, but also the amount of loss of manufactured articles during these last firing stages.

Other objects of the invention will be set forth hereinafter, or will be apparent from the description and the drawings, in which are illustrated embodiments exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown or described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which are disclosed such practical constructions.

Ceramic articles are formed or shaped in many different ways. One method involves forming a casting in a mold. In such case, the ingredients for such operation have been prepared in the manner known to those skilled in the art, generally with sufficient fluidity to be capable of introduction into the cavity of a mold. In such case, the material may, for the purposes here, be considered as a liquid suspension of ceramic materials although in most cases such suspensions are very viscous, although flowable. Water generally is the carrier liquid. Various pressures are used to introduce the ceramic suspension into the mold cavity. The mold has walls which absorb the liquid, the water where it is used, and thus causes the ceramic material to reach a state of hardness sufficient to permit the separation of the "casting" from the mold when its sections are parted for that purpose. Pressures varying from a static pressure head of the fluid mass itself to relatively high pressure may be used for bringing the ceramic suspension into the mold cavity, and to assist in the absorption of the carrier liquid by the mold walls. Obviously, increase of the hydraulic pressure will effect reduction of the time necessary for absorption of the carrier liquid by the mold walls. Still each mold will be kept engaged with a single casting for a relatively long time to complete the separation of sufficient carrier liquid from the casting so that the casting may safely be removed from within the mold cavity.

Other methods also are used, as, for instance, pressing of the ingredients after they have been prepared by suitable mixing operations, either in the dry state, or with suitable carriers. One of such processes is known as jiggering, where a shaped article is obtained by working a mass of the material without flowing the prepared material within the cavity of the mold. Another process is known as drain casting where the material is deposited upon the faces of the mold, either centrifugally or otherwise, to produce a predetermined layer of the ceramic particles. In this case, the total cubic contents of the cavity do not determine the cubic contents of the body finally formed.

The properties of clay create problems in any one of these processes. Where forming is effected in the cavity of a mold which thus defines a casting, clay as an ingredient in its raw state, that is, without having been subjected to the benefits of the process here to be described, literally gums up the walls of the mold. Thus while it is not intended to limit the results of the processing here to be described to use in connection with forming castings in the cavities of molds, one of the important associations for the invention resides in effectuation of the formation of a ceramic body in the cavity of a mold where absorption of the carrier liquid from the casting is effected by the walls of the mold. In such cases, the walls of the mold, which may be made of liquid absorbing material, draws the liquid from the material in the cavity. Plaster-of-Paris, or materials with like liquid-absorbing properties, are in common use for such purpose. With materials prepared as here defined, it has been found possible to produce workable castings from various formulae of ceramic materials in liquid suspension, to eliminate defects in the formed article such as the definition of cavities in the casting at areas of separation of the solid material, and to accomplish these results by the use of a mold one face of which is impervious, or otherwise ineffective to absorb moisture from the casting in the cavity. In such case, the total liquid to be withdrawn from the casting must be absorbed through a single moisture pervious or absorbent wall of the mold. Thus, liquid from those parts of the body formed in the cavity of the mold furthest from that single wall must pass through the full thickness of the cavity.

In the formation of castings in molds in ordinary practice, the fine particles of clay are considered as functioning to impede flow of the liquid carrier. Their presence in a mixture for use in a mold of the advanced character here to be defined would increase, rather than decrease, the molding time. However, it has been observed that, by preparing the molding materials in the manner here to be described, the time required after charging a mold until the mold may be opened for removal of the casting has been reduced considerably. For facility in identification, the materials prepared from use as here further set forth will be referred to as "reacted" materials.

By the use of reacted material in a mold where only one face is moisture pervious or absorbent, the time for separation of a casting capable of manpulation not only has been found to be shorter than in usual molding operations, but predictability of dimensions, uniformity of texture or homogeneity of the ingredients, of the formed piece, have been found to be present in substantially all pieces prepared from the same mix, attended by sharp increase in strength and decrease in cracking. Furthermore, castings made as here specified have been found not to require support during the final or bisque firing, hereafter to be referred to, for clarity in discussion, as the "sintering" stage.

One factor which presents a serious problem in handling the pieces formed by molding or other shaping operations is the varying characteristics of the different ingredients which enter into the liquid suspensions heretofore used, generally referred to as "slip." The slip ingredients for ceramic ware almost invariably includes alumina which forms a relatively large part of the clays used for molding, together with other substances. Substances such as fluxes, as, for instance, feldspars, also generally are found as ingredients of slips. Siliceous substances, in addition to the silica combined in clays, are added in forming such slips. Usually, clays contain substances such as carbonaceous and other oxidizable substances as part of the original deposit. The alumina and silica of clays are present as crystalline structures having substantial water of crystallization.

A slip is a mixture, not a chemical composition. The different ingredients are assembled, and by well known processing, are dispersed as uniformly as possible in producing the slip. Some degree of uniformity will be attained, but this uniformity is the same as in any physical mixture in that the particles are discrete and separate from each other. When an article has been formed from such slip, and has been dried, it is fired. During this firing, the formed articles loses not only the liquid left in the formed article after drying, but also water of crystallization, both in the form of steam. The carbonaceous and other oxidizable matter burns off at the temperature of the kiln, and those gases likewise pass off. There is resultant shrinkage, both during the drying stage and the firing stage. Also the formation either of steam or the gases from oxidation of the carbonaceous and other oxidizable matter has been observed to affect the disposition of the solid particles with relation to each other. The ingredients likewise pass through various phases at different temperatures. There is at least interaction between adjacent discrete particles. It is known that some chemical interaction takes place. One phase indicated is the formation of some solid solution of one or more of the ingredients in another. Some of the results of such interaction are substances having characteristics different from those of the original components. All of these changes have resulted in strain and stress upon the body which results from this firing, with various kinds of fractures or lines of stress which, when the articles is placed in use, result in breakage. Such breakage occurs in many cases right in the plant where the article has been manufactured, and is a very high cost factor.

In the process here being considered, many undesirable characteristics, including those here discussed, are substantially eliminated. The result has been in the production of uniform, substantially homogeneous formed pieces, substantially uniform in their cross-sectional characteristics, with much greater strength and with positive capability of predicting the dimensions of the final product, including substantial uniformity of density at various sections of a fabricated piece. The variation in content of various ingredients at different locations in a piece fabricated with an ordinary slip, the variations of the fines of natural clay throughout a formed piece, where manufactured in the usual manner, makes difficult the production of uniform densities at such different locations. These factors also contribute to an inability to attain uniform electrical characteristics in the finally produced body. Thus, in the usual fabricated piece, after firing, the electrical losses at different points in the piece will vary; there will also be variations in density, in specific gravity. Thus, in effect, the firing stage, while producing some degree of chemical change, does not result in uniformity at different locations in the same piece, for a number of reasons including variations in the interstitial spaces between particles which have entered into a chemical reaction or a solid solution. Thus density of the final product is found to be far less than the true density would be if the entire mass had gone through a chemical change.

Likewise variation in structural strengths is found at different locations. Water pocketing, or localized amounts of oxidizable matter, may well produce widely varying strengths at different points. One desired end sought by clay molders has been the reduction of the temperatures necessary for processing the formed piece both for the bisque stage and the glost stage.

In the process considered here, a mixture of the desired ingredients is made up either in the dry or wet state. The ingredients for each mixture are determined by the particular end product sought. For instance, in one case where a high heat resistant body, with important electrical properties, is desired, the composition is as follows:

A

| | Percent |
|---|---|
| Low sodium aluminum oxide | 90 |
| Ball clay | 4 |
| Talc | 6 |
| | 100 |

In the making of china bodies, many formulae are possible; two examples are given:

B

| | Percent |
|---|---|
| Nepheline syenite | 57.5 |
| Aluminum oxide | 15.0 |
| Georgia kaolin | 27.5 |
| | 100.0 |

C

| | |
|---|---|
| Pennsylvania quartzite | 37.0 |
| Feldspar | 18.5 |
| Calcined english china clay | 21.0 |
| Georgia kaolin | 23.5 |
| | 100.0 |

For the production of a refractory body, the following formula may be used:

D

| | Percent |
|---|---|
| Kentucky-Tennessee ball clay | 14.2 |
| Georgia kaolin | 21.7 |
| French talc | 17.0 |
| Calcined Georgia kaolin | 47.1 |
| | 100.0 |

For the production of a wall tile body, the following is one of the formulae which may be used:

E

| | Percent |
|---|---|
| Talc | 60.0 |
| Ball clay | 40.0 |
| | 100.0 |

In the manufacture of sanitary ware, among the available formulae is the following:

F

| | Percent |
|---|---|
| Feldspar | 25.0 |
| Pennsylvania quartzite | 25.0 |
| Ball clay | 25.0 |
| Kaolin | 25.0 |
| | 100.0 |

In the case of each of these compositions, and other compositions the ingredients of which will be determined by the properties of the end product desired, the mixtures may be set up in any well known manner as presently used for the purpose of providing a slip or similar workable medium for forming. Where a slip is made with a carrier such as water, the mix is brought to a viscosity such as to facilitate working. While many different methods of handling the mixed ingredients may be utilized, any of which are available in the art, one method is here described as an illustration only, and involves a procedure to facilitate handling. For instance, the slip may be extruded to form rods or bars, or in a form similar to thick spaghetti, or noodles. The form into which the mass is thus shaped has no predetermined relation to any particular end product to be produced. By the formation as rods, or bars, or spaghetti, or noodles, or the like, the plastic mass is divided up into portions having large areas for heat absorption, which lend themselves to ease in handling. The mass, in this form, as, for instance, spaghetti, is subjected to the temperature of a kiln, which may be a batch kiln or a continuously fed and discharging operation. The temperature and time of processing will vary in accordance with the specific formula involved. Because of the relatively large exposed surface, the application of heat is facilitated. In those cases where vitrification is indicated, the temperature is properly controlled to attain, in this mass which obviously has no definitive form, the results which normally would be obtained in the usual bisque firing of a formed piece. For further reference, this processing may be referred to as the "reacting" stage. For instance, temperatures for compositions A, B, C, D, E and F were found satisfactory at 2900° F., 2150° F., 2345° F., 2570° F., 2093° F., and 2390° F., respectively. The heating rates may be determined by the various ingredients. Generally, heating at about 100° F. per hour was found satisfactory, although the process is not necessarily so limited. After the peak temperature in each case is reached, the temperature is maintained for a sufficient time, according to the different mixtures, to complete the reacting to the state desired. For instance, it was found effective to maintain the indicated maximum temperature for composition A for a period of three hours. In each of the other cases, heating was maintained up to eight to ten hours.

As a result of this processing, the material, without formal shaping or molding, undergoes all of the chemical and physical changes which it would otherwise undergo in the usual bisque firing. The water of crystallization and the carbonaceous and other oxidizable matter are disposed of; yet their removal at this stage does not result in any damage as no molded or formed structure is involved to suffer from these changes. Where mullite is formed, and if the silica goes through the cristobalite phase, these changes have no destructive effect. Interstitial water as a part of a mold form in a final stage is not necessary for consideration since, even if present, it cannot affect the final product to be produced.

Cooling of the reaction product presents no problem, and requires no control. It is possible to dump the reaction product into water or other liquid to produce cooling and partial fragmentation. Then the reaction product is further worked to reduce the particles to a desired size by any suitable means. This reacted material, in the processes here involved, was in each case ground, and then separation of the reaction material according to particle size was effected as here specified.

Curves were plotted to determine effective combinations of particle size for each formula. The degree of fineness of the particles here arrived at is of importance in further processing of the reaction material. Particles of clay are extremely fine. It is accepted that this fineness is one reason for many of the problems encountered in clay molding. For the further processing of the reaction material it has been found to be a matter of importance to control the particle size of the reacted material within definite limits, as determined from the curves. For instance, it was found desirable, as a general rule, to limit the reacted material to a particle size substantially not greater than 44 microns. For the further processing, it was found desirable that not more than 9.5% to 35% of the particles should be finer than one micron. In many cases, very effective results were attained by limiting the particles so that not more than 15% to 20% were finer than one micron. This formulation, arrived at after many tests, showed the desired results in various final products.

The reacted material, as finally separated for desired particle size, has characteristics which were not present in the material before it was reacted. It has a high degree of uniformity. To a substantial degree, there has been a change in the structure of the ingredients, indeed substantial chemical as well as physical change. When the reacted material is broken down in size after the reaction firing, the reacted material breaks up into particles of a high degree of uniformity in structure and constituents. The particles of reacted material, thus separated, are processed further by forming to the shape of a body for the article or articles sought to be produced. The reacted material lends itself to such forming by means of a number of different methods. For instance, the particles may be made up into a suspension in a liquid. Such suspension is referred to herein as a "ceramic suspension." Such ceramic suspension may be subjected to forming in any one of a plurality of different methods. Here will be considered its utilization by forming in (a) a mold all of the faces of which are substantially liquid absorbent, and (b) a mold at least a substantial portion of the walls of which are substantially nonabsorbent of liquid.

In one method, the ceramic suspension may be admitted to a mold the walls of which will absorb the liquid from the suspension. The usual mold is made of a material such as plaster-of-Paris. Other materials are used which likewise lend themselves to ready shaping to the contours of articles to be produced, and which likewise are moisture absorbent. All of these substances, found useful for this purpose, are here included in the general term of "plaster-of-Paris."

Molds are made in the usual manner. In the case here, the ceramic suspension, under suitable pressure, is introduced into the cavity of such a mold in the usual manner. A property of the reacted material is found in the fact it does not have resistance to movement of the carrier liquid therethrough which characterised ordinary clay slip. Although the formed piece or casting which will be removed from the mold cavity with the use of the reacted material will be found to have strength characteristics not heretofore had with a slip casting, yet the time for the absorption of the interstitial water from the particles of reacted material within the cavity has been found to be remarkably shortened. For instance, in a side-by-side test made with ordinary slip and a ceramic suspension of reacted material, the reacted material suspension had given up its water so that the test member could be removed from its mold in about one-third of the time required for safe handling of a test specimen made by means of an ordinary clay slip. The test member made from reacted material apparently was dry enough for further processing, such as the usual drying operations, while the test piece from clay slip still showed wetness after almost three times the moisture-separating period. At its center, the test piece made from ordinary clay slip had all of the usual indications of pieces made from ordinary slip which interfere with effective uniformity, including a definite separation line at the mid-section, indicating layering or separation of clay and water at that point.

In making up the ceramic suspension of reacted material, sufficient liquid such as water is used to arrive at a predetermined viscosity. In substantially all cases, about 30% of water by weight to that of the dry solid was used. In the case of the reacted material from compositions D, E and F, satisfactory results were attained with a water content of about 30% to 33%.

In some cases, an ingredient may be added to the ceramic suspension to reduce the quantity of water or such fluid necessary to attain the desired viscosity. Thus, in the case of a formula such as compositions A, C, D, E and F, about 0.1% sodium pyrophosphate was found effective; for composition B, the composition itself functioned without requiring any additive. In the case of other formulae, other ingredients, according to the properties of the reacted material, will serve the necessary purpose, and will be determined according to principles well known in the art.

Under the operations here being considered, viscosity of the various ceramic suspensions tends to be a problem of the particular initial ingredients involved. However, it has been found that a viscosity range for a workable ceramic suspension is between 40 and 1000 centipoises. The preferred limit is under 120 centipoises. Also, the amount of water, based on the true weight of the dry reacted material, for proper working, has been found to be between 25% and 35%. For certain purposes, the range is between 27.5% and 32.5%.

With the running time for the separation of the formed article from its liquid thus decreased to a great degree, the time each mold necessarily must retain each casting has been reduced so that the mold is made available for many more operations during a total working time. An important factor is the control of particle size, and greater uniformity in chemical and physical properties of the particles of reacted material. Control of the particle size appears to result in formation of a product in which particles of varying sizes interfit with each other in the spaces formed by engagement of the larger particles with each other so that a denser product results.

Thus, in a finally formed article before firing, less water must be disposed of. Whatever water is not withdrawn, as, for instance, by the mold faces, is not in the form of chemically combined water, but is interstitial water which may be driven off readily in the subsequent firing stage.

The reacted material makes possible efficient molding by means of a mold at least a major portion of the mold faces of which is impervious to or does not absorb water. Castings derived from molding in this manner show elimination of the problems which had to be met in castings derived from molding clay heretofore. It has heretofore been observed that when the liquid carrier is absorbed from a casting in two directions in an ordinary mold all of the walls of which are moisture absorbent, a line of cleavage appears at a midsection of the casting which carries through into the finally fired piece, and is an element of weakness. When such a casting is removed from its mold, dried, and then fired, a definite cavity has been found to exist in many cases within the body of the bisque thus produced. It is considered that, in such molding, the water separates from the mixture in multiple directions, with resultant shrinkage during this stage. New material does not make up for this shrinkage, apparently, leaving an area of cleavage within the formed body.

Figure 1:
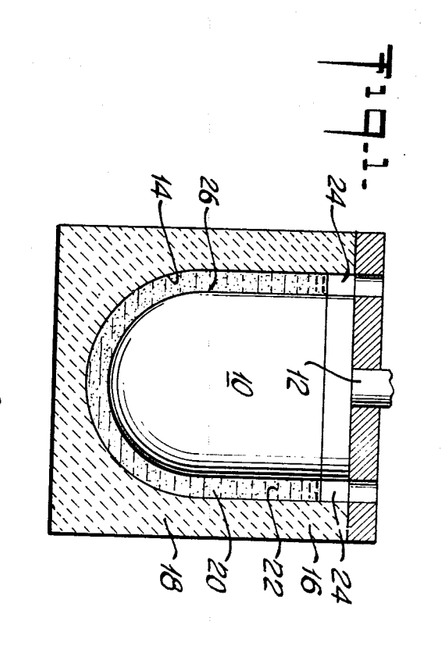
FIGS. 1, 2 and 3 are cross-sectional views of a number of different mold structures adapted for use in the process to be described.

In the mold structure shown in the drawings, in FIG. 1, a device is provided which in great degree overcomes this situation. In FIG. 1, a mandrel 10 is supported from a spindle 12. Suitable means are provided for maintaining mandrel 10 spaced from the faces 14 of walls 16 of mold body 18 so as to provide the space 20 for the formation of a casting 22 between mandrel 10 and body 18. Sprues 24 may be provided in the usual manner. In this case, mandrel 10 may be constructed so that its face 26, which may be highly polished to impart a smooth face to the casting to be formed, is moisture impervious. An effective method for that purpose is to make mandrel 10 of some metal, such as stainless steel. Body 18, including face 14 opposed to mandrel 10, is moisture pervious or absorbent, being made of usual mold material.

Figure 2:
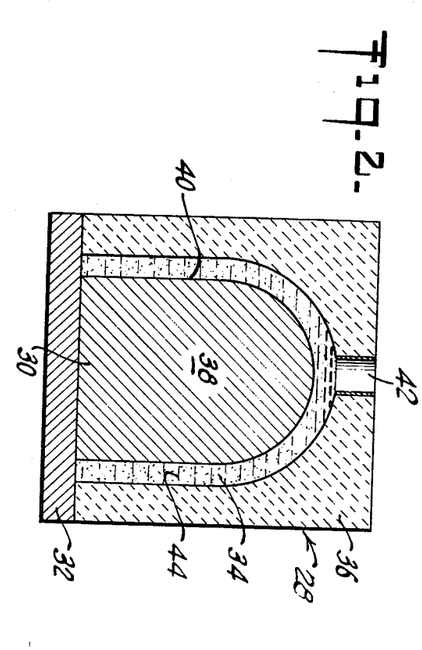

Mold 28 of FIG. 2 is especially adapted for the purpose of using a ceramic suspension such as here described. It is intended to shape the piece to be formed in accordance with the shape of a mandrel of material which does not take moisture out of the casting. In the structure shown in FIG. 2, the mold includes a central mandrel 30 which is secured to a base 32 and is removable from within cavity 34 defined in mold body 36. The mold may be made in the required number of sections for separation for the usual purposes; these structural details are not considered here as the construction of a mold in the required number of sections for such purposes is matter well known to men of the art. However, mandrel 30 may be a body 38 the face 40 of which is not absorbent of moisture or is moisture impervious. This result may be effected by making either that part of the mandrel 30 which defines face 40 of metal, or of some other moisture impervious or non-absorbent material, or by making mandrel 30 of any material and applying a moisture impervious coating to that surface, the material for such coating being such as not to react with any of the ingredients which enter into the ceramic suspension used in forming the casting. The usual sprue or gate 42 will be provided for such a mold in body 36. Body 36 is made moisture pervious except that, at sprue 42, the walls of the sprue are made of moisture impervious material in substantially the same manner as face 40 is made moisture impervious.

It is obvious that, after a casting 44 is made in such a mold, body 36 may be removed from about the casting which will be retained upon the mandrel. Thereafter the casting may be removed from the mandrel.

Figure 3:
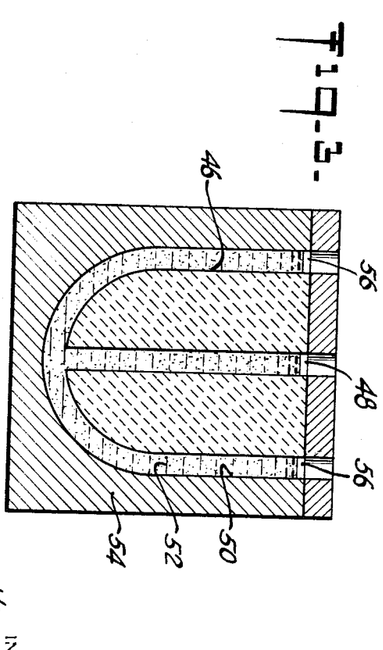

In FIG. 3, a mold is shown in which a mandrel 46 is provided with a sprue 48 extending vertically through the mandrel. In this case, the mandrel may be metal. Sprue 48 must be moisture imprevious. Mandrel 46 is spaced from wall 50 of cavity 52 formed by body 54 so as to provide shaping for the casting to be derived from this mold. Mandrel 46 may be supported in any desired manner so as to maintain the desired spacing. Sprues 56 are formed by this spacing to assist in the entry of the ceramic suspension into cavity 52.

In any of those modifications, and others which may be designed according to the article to be molded, one face of the mold is moisture pervious. The faces of the mold opposed to these moisture pervious faces are moisture impervious, whether from a coating or from the use of material such as stainless steel to form that face. When a ceramic suspension is introduced into the cavtiy of any one of these molds, the water contained in the ceramic suspension will move toward the moisture pervious face. Obviously the water which is furthest removed from the moisture pervious face will have to travel through the material from which water has first been withdrawn by the absorbent characteristics of the moisture pervious wall. But the disposition of the solids in the ceramic suspension will result in the increase in thickness of the layer of material being formed in a direction contrary to the movement of the water. The first compacting of the particles will take place at that moisture absorbing wall, and thereafter densification of the particles will proceed in a direction away from that wall. Even though some particles of the ceramic suspension may adhere to the moisture impervious wall, there will be no densification in that direction since no water will be absorbed by that wall. The final result is that when substantially sufficient water has been absorbed from the casting by the moisture absorbent wall, densification of the solids will have been completed substantially in a single direction, that is, outwardly from the moisture pervious wall. Since densification did not proceed in two directions at once, densification will be substantially uniform in that it proceeded with regularity in a single direction, and no cleavage or demarcation will be defined between two distinctly different bodies of densified material, as in the usual body molded from slip in a mold substantially all of the walls of which are moisture pervious.

Now, the castings or formed pieces derived from any of these forming steps are subjected to firing in suitable kilns. The temperatures for this stage, which may be referred to as the "sintering" stage, are substantially lower than the temperatures for the reaction stage. The only purpose now is to obtain sufficient interfacial reaction of the particles so that they bond to each other. It has been found that the formed pieces, when placed in the kiln, maintain their shapes without the usually requisite building up of supports, such as sand, beneath extending portions of the casting.

It was found that, for the sintering stage which is now comparable to the firing of the bisque in usual clay firing, maximum temperature of 2768° F. for articles derived from composition A, 2150° F. for articles derived from composition B, 2280° F. for articles derived from composition C, 2462° F. for articles derived from composition D, 2093° F. for articles derived from composition E, and 2345° F. for articles derived from composition F, produce final articles of great strength, predictable dimensions, and substantial uniform cross-sectional characteristics. Since lower maximum temperatures are found possible, many desirable effects result, as, for instance, avoidance of the formation of cristobalite and its distorting influences which result at higher temperature.

Also, an unexpected result has been the elimination of criticality for the temperature for vitrification. It has been ascertained that vitrification may be effected within a band of temperature extending over a range of about 150° F.

Many other changes could be effected in the particular constructions, and in the methods of use and construction, and in specific details thereof, hereinbefore set forth, without substantially departing from the invention intended to be defined herein, the specific description being merely of embodiments capable of illustrating certain principles of the invention.

What is claimed as new and useful is:

1. A process for manufacturing ceramic articles, including the steps of producing a substantially uinform mixture of a plurality of ceramic material including clay in proportions determined by a particular end product to be produced, dividing up the mixture into portions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, eliminating from the disintegrated particles all particles of a size outside certain predetermined limits, making a ceramic suspension of the particles within the predetermined limits in a carrier liquid under controlled vscosity conditions, forming a ceramic casting from the ceramic suspension between opposed mold faces one of which is pervious to and an absorbent for the carrier liquid and the other is impervious to and does not absorb the carrier liquid so that the ceramic particles deposit and build up substantially only on the pervious face, separating the casting from the mold, and sintering the casting at a temperature substantially below the reaction temperature.

2. A process for manufacturing ceramic articles, including the steps of producing a substantially uniform viscous mixture of a plurality of ceramic materials including clay in a mixture liquid in proportions determined by a particular end product to be produced, dividing up the viscous mixture into relatively small portions to which are imparted any shape without any particular relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, eliminating from the disintegrated particles all particles of a size outside certain predetermined limits, making a ceramic suspension of the particles within the predetermined limits in a carrier liquid under controlled vscosity conditions, forming a casting from the ceramic suspension between opposed mold faces one of which is pervious to and an absorbent for the carrier liquid and the other is impervious to and does not absorb the carrier liquid so that the ceramic particles deposit and build up substantially only on the pervious face, separating the casting from the mold, drying the casting, and sintering the casting at a temperature substantially below the reaction temperature.

3. A process for manufacturing ceramic articles, including the steps of producing a substantially uniform viscous mixture of a plurality of ceramic materials including clay in a mixture liquid in proportions determined by a particular end product to be produced, dividing up the viscous mixture into relatively small portions to which are imparted any shape without any particular relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, forming a ceramic suspension of the disintegrated particles in a carrier liquid and producing a casting from the ceramic suspension between opposed mold faces one of which is pervious to and an absorbent for the carrier liquid and the other is impervious to and does not absorb the carrier liquid so that the ceramic particles deposit and build up substantially only on the pervious face, and thereafter sintering the casting thus formed at a temperature substantially below the reaction temperature.

4. A process for manufacturing ceramic articles, including the steps of firing shapes of no predetermined contouring formed from a mixture of a plurality of ceramic materials including clay in proportions determined by a particular end product to be produced to a temperature of predetermined magnitude sufficient to carry to a desired end point effectuation of chemical and physical changes in the shaped mixture, disintegrating the reaction product into fine particles, forming a ceramic suspension of the disintegrated particles in a carrier liquid and producing a casting from the ceramic suspension between opposed mold faces one of which is pervious to and an absorbent for the carrier liquid and the other is impervious to and does not absorb the carrier liquid so that the ceramic suspended particles deposit and build up substantially only on the pervious face, and thereafter sintering the casting thus formed at a temperature substantially below the reaction temperature.

5. A process for manufacturing ceramic articles, which includes the steps of preparing a viscous ceramic suspension in a liquid carrier of ground ceramic materials which have been mixed and then reacted through a temperature range to a maximum temperature predetermined to complete certain physical and chemical changes in the mixed material, and then ground to a particle size within certain predetermined limits, forming a casting from the ceramic suspension between opposed mold faces one of which is pervious to and an absorbent for the carrier liquid and the other is impervious to and does not absorb the carrier liquid so that the ceramic particles deposit and build up substantially only on the pervious face, separating the casting from the mold, and sintering the casting at a temperature substantially below the reaction temperature.

6. A process for manufacturing ceramic articles, including the steps of producing a substantially uniform viscous mixture of a plurality of ceramic materials including clay in a mixture liquid in proportions determined by a particular end product to be produced, dividing up the viscous mixture into relatively small portions to which are imparted any shape without any particular relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, processing the disintegrated particles to retain only particles of a size of 44 microns or smaller, making a ceramic suspension of the processed particles in a carrier liquid under controlled viscosity conditions, forming a casting from the ceramic suspension between opposed mold faces one of which is pervious to and an absorbent for the carrier liquid and the other is impervious to and does not absorb the carrier liquid so that the ceramic particles deposit and build up substantially only on the pervious face, separating the casting from the mold, and sintering the casting at a temperature substantially below the reaction temperature.

7. A process for manufacturing ceramic aricles, including the steps of producing a substantially uniform viscous mixture of a plurality of ceramic materials including clay in a mixture liquid in proportions determined by a particular end product to be produced, dividing up the viscous mixture into relatively small portions to which are imparted any shape without any particular relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, processing the disintegrated particles to retain only particles of a size of 44 microns or smaller and of which processed particles not more than between 9.5% and 35% are of the size of 1 micron or smaller, making a ceramic suspension of the processed particles in a carrier liquid under controlled viscosity conditions, forming a casting from the ceramic suspension between opposed mold faces one of which is pervious to and an absorbent for the carrier liquid and the other is impervious to and does not absorb the carrier liquid so that the ceramic particles deposit and build up substantially only on the pervious face, separating the casting from the mold, and sintering the casting at a temperature substantially below the reaction temperature.

8. A process for manufacturing ceramic articles, including the steps of producing a substantially uniform viscous mixture of a plurality of ceramic materials including clay in a mixture liquid in proportions determined by a particular end product to be produced, dividing up the viscous mixture into relatively small portions to which are imparted any shape without any particular relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, processing the disintegrated particles to retain only particles of a size of 44 microns or smaller and of which are processed particles not more than between 15% and 20% are of the size of 1 micron or smaller making a ceramic suspension of the processed particles in a carrier liquid under controlled viscosity conditions, forming a casting from the ceramic suspension between opopsed mold faces one of which is pervious to and an absorbent for the carrier liquid and the other is impervious to and does not absorb the carrier liquid so that the ceramic particles deposit and build up substantially only on the pervious face, separating the casting from the mold, and sintering the casting at a temperature substantially below the reaction temperature.

9. A process for manufacturing ceramic articles, including the steps of producing a substantially uniform viscous mixture of aluminum oxide, clay and talc in a mixture liquid, dividing up the viscous mixture into viscous relatively small portions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, and eliminating from the disintegrated particles all particles of a size outside certain predetermined limits.

10. A process for manufacturing ceramic articles, including the steps of producing a substantially uniform viscous mixture of 90% aluminum oxide, 4% clay and 6% talc in a mixture liquid, dividing up the viscous mixture into relatively small portions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, and eliminating from the disintegrated particles all particles of a size outside certain predetermined limits.

11. A process for manufacturing ceramic articles, including the steps of producing a substantially uniform viscous mixture of aluminum oxide, nepheline syenite and kaolin in a mixture liquid, dividing up the viscous mixture into relatively small portions to which are imparted any shape wthout any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, and eliminating from the disintegrated particles all particles of a size outside certain predetermined limits.

12. A process for manufacturing ceramic articles, including the steps of producing a substantially uniform viscous mixture of 15% aluminum oxide, 57.5% nepheline syenite and 27.5% kaolin in a mixture liquid, dividing up the viscous mixture into relatievly small portions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, and eliminating from the disintegrated particles all particles of a size outside certain predetermined limits.

13. A process for manufacturing ceramic articles, including the steps of producing a substantially uniform viscous mixture of quartzite, feldspar, china clay and kaolin in a mixture liquid, dividing up the viscous mixture into relatively small portions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, and eliminating from the disintegrated particles all particles of a size outside certain predetermined limits.

14. A process for manufacturing ceramic articles, including the steps of producing a substantially uniform viscous mixture of 37% quartzite, 18.5% feldspar, 21% china clay and 23.5% kaolin in a mixture liquid, dividing up the viscout mixture into relatively small portions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, and eliminating from the disintegrated particles all particles of a size outside certain predetermined limits.

15. A process for manufacturing ceramic articles, including the steps of producing a substantially uniform viscous mixture of kaolin, calcined kaolin, clay and talc in a mixture liquid, dividing up the viscous mixture into relatvely small portions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, and eliminating from the disintegrated particles all particles of a size outside certain predetermined limits.

16. A process for manufacturng ceramic articles, including the steps of producing a substantially uniform viscous mixture of 21.7% kaolin, 47.1% calcined kaolin, 14.2% clay and 17% talc in a mixture liquid, dividing up the viscous mixture into relatively small portions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, and eliminating from the disintegrated particles all particles of a size outside certain predetermined limits.

17. A process for manufacturing ceramic articles, including the steps of producing a substantially uniform viscous mixture of clay and talc in a mixture liquid, dividing up the viscous mixture into relatively small portions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, and eliminating from the disintegrated particles all particles of a size outside certain predetermined limits.

18. A process for manufacturing ceramic articles, including the steps of producing a substantially uniform viscous mixture of 40% clay and 60% talc in a mixture liquid, dividing up the viscous mixture into relatively small portions to which are imparted any shape without any predetermned relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, and eliminating from the disintegrated particles all particles of a size outside certain predetermined limits.

19. A proces for manufacturing ceramic articles, including the steps of producing a substantially uniform viscous mixture of quartzite, feldspar, clay and kaolin in a mixture liquid, dividing up the viscous mixture into relatively small portions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, and eliminating from the disintegrated particels all particles of a size outside certain predetermined limits.

20. A process for manufacturing ceramic articles, including the steps of producing a substantially uniform viscous mixture of 25% quartzite, 25% feldspar, 25% clay and 25% kaolin in a mixture liquid, dividing up the viscous mixture into relatively small portions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, and eliminating from the disintegrated pasticles all particles of a size outside certain predetermined limits.

21. A process for manufacturing ceramic articles, including the steps of producing a substantially uniform viscous mixture of a plurality of ceramic materials including clay in a mixture liquid in proportions determined by a particular end product to be produced, dividing up the viscous mixture into relatively small portions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, eliminating from the disintegrated particles all particles of a size outside certain predetermined limits, forming the disintegrated particles into a shape determined for the article to be produced, and sintering the article shape at a temperature substantially below the reaction temperature.

22. A process for manufacturing ceramic articles, including the steps of producing a substantially uniform viscous mixture of a plurality of ceramic materials including clay in a mixture liquid in proportions determined by a particular end product to be produced, dividing up the viscous mixture into relatively small potrions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, processing the disintegrated particles to discard therefrom substantially all particles of a size greater than 44 microns and substantially all particles finer than one micron in excess 15% to 20% of the total weight of the particles, making a ceramic suspension of the remaining particles in a carrier liquid under controlled viscosity conditions, forming a ceramic casting from the ceramic suspension within a mold walls of which are moisture absorbent, separating the casting from the mold, and sintering the casting at a temperature substantially below the reaction temperature.

23. A process for manufacturing ceramic articles, including the steps of producing a substantially uniform viscous mixture of a plurality of ceramic materials including clay in a mixture liquid in proportions determined by a particular end product to be produced, dividing up the viscous mixture in relatively small portions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, eliminating from the disintegrated particles all particles of a size outside certain predetermined limits, making a ceramic suspension of the particles within the predetermined limits in a carrier liquid under controlled viscosity conditions, forming a ceramic casting from the ceramic suspension within a mold walls of which are moisture absorbent, separating the casting from the mold, and sintering the casting at a temperature substantially below the reaction temperature.

24. A process for manufacturing ceramic articles, including the steps of producing a substantially uniform viscous mixture of 90% aluminum oxide, 4% clay and 6% talc in a mixture liquid, dividing up the viscous mixture into relatively small portions to which are imparted any shape without any predetermined relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, processing the disintegrated particles to discard therefrom substantially all particles of a size greater than 44 microns and substantially all particles finer than one micron in excess of 15% to 20% of the total weight of the particles, making a ceramic suspension of the remaining particles in a carrier liquid under controlled viscosity conditions, forming a ceramic casting from the ceramic suspension within a mold walls of which are moisture absorbent, separating the casting from the mold, and sintering the casting at a temperature substantially below the reaction temperature.

25. A process for manufacturing ceramic articles, including the steps of producing a substantially uniform viscous mixture of 90% aluminum oxide, 4% clay and 6% talc in a mixture liquid, dividing up the viscous mixture into relatively small portions to which are imparted any shape without any predetermined relation to the shape of any end product to be produced, reacting the shaped mixture by progressively raising its temperature to a maximum of about 2900° F. to effectuate chemical and physical changes in the shaped mixture, disintegrating the reaction product into fine particles, processing the disintegrated particles to discard therefrom substantially all particles of a size greater than 44 microns and substantially all particles finer than one micron in excess of 15% to 20% of the total weight of the particles, making a ceramic suspension of the remaining particles in a carrier liquid under controlled viscosity conditions, forming a ceramic casting from the ceramic suspension within a mold walls of which are moisture absorbent, separating the casting from the mold, and sintering the casting at a temperature substantially below the reaction temperature.

26. A process for manufacturing ceramic articles, including the steps of producing a substantially uniform viscous mixture of 90% aluminum oxide, 4% clay and 6% talc in a mixture liquid, dividing up the viscous mixture into relatively small portions to which are imparted any shape without any predetermined relation to the shape of any end product to be produced, reacting the shaped mixture by progressively raising its temperature to a maximum of about 2900° F. to effectuate chemical and physical changes in the shaped mixture, disintegrating the reaction product into fine particles, processing the disintegrated particles to discard therefrom substantially all particles of a size greater than 44 microns and substantially all particles finer than one micron in excess of 15% to 20% of the total weight of the particles, making a ceramic suspension of the remaining particles in a carrier liquid under controlled viscosity conditions, forming a ceramic casting from the ceramic suspension within a mold walls of which are moisture absorbent, separating the casting from the mold, and sintering the casting by progressively raising its temperature to a maximum of about 2768° F.

27. A process for manufacturing ceramic articles, including the steps of producing a substantially uniform viscous mixture of 15% aluminum oxide, 57.5% nepheline syenite and 27.5% kaolin in a mixture liquid, dividing up the viscous mixture into relatively small portions to which are imparted any shape without any predetermined relation to the shape of any end product to be produced, reacting the shaped mixture by progressively raising its temperature to a maximum of about 2150° F. to effectuate chemical and physical changes in the shaped mixture, disintegrating the reaction product into fine particles, processing the disintegrated particles to discard therefrom substantially all particles of size greater than 44 microns and substantially all particles finer than one micron in excess of 15% to 20% of the total weight of the particles, making a ceramic suspension of the remaining particles in a carrier liquid under controlled viscosity conditions, forming a ceramic casting from the ceramic suspension within a mold walls of which are moisture absorbent, separating the casting from the mold, and sintering the casting by progressively raising its temperature to a maximum of about 2150° F.

28. A process for manufacturing ceramic articles, including the steps of producing a substantially uniform viscous mixture of 37% quartzite, 18.5% feldspar, 21% china clay and 23.5% kaolin in a mixture liquid, dividing up the viscous mixture into relatively small portions to which are imparted any shape without any predetermined relation to the shape of any end product to be produced, reacting the shaped mixture by progressively raising its temperature to a maximum of about 2345° F. to effectuate chemical and physical changes in the shaped mixture, disntegrating the reaction product into fine particles, processing the disintegrated particles to discard therefrom substantially all particles of a size greater than 44 microns and substantially all particles finer than one micron in excess of 15% to 20% of the total weight of the particles, making a ceramic suspension of the remaining particles in a carrier liquid under controlled viscosity conditions, forming a ceramic casting from the ceramic suspension within a mold walls of which are moisture absorbent, separating the casting from the mold, and sintering the casting by progressively raising its temperature to a maximum of about 2280° F.

29. A process for manufacturing ceramic articles, including the steps of producing a substantially uniform viscous mixture of 21.7% kaolin, 47.1% calcined kaolin, 14.2% clay and 17% talc in a mixture liquid, dividing up the viscous mixture into relatively small portions to which are imparted any shape without any predetermined relation to the shape of any end product to be produced, reacting the shaped mixture by progressively raising its temperature to a maximum of about 2570° F. to effectuate chemical and physical changes in the shaped mixture, disintegrating the reaction product into fine particles, processing the disintegrated particles to discard therefrom substantially all particles of a size greater than 44 microns and substantially all particles finer than one micron in excess of 15% to 20% of the total weight of the particles, making a ceramic suspension of the remaining particles a carrier liquid under controlled viscosity conditions, forming a ceramic casting from the ceramic suspension within a mold walls of which are moisture absorbent, separating the casting from the mold, and sintering the casting by progressively raising its temperature to a maximum of about 2462° F.

30. A process for manufacturing ceramic articles, including the steps of producing a substantially uniform viscous mixture of 40% clay and 60% talc in a mixture liquid, dividing up the viscous mixture into relatively small portions to which are imparted any shape without any predetermined relation to the shape of any end product to be produced, reacting the shaped mixture by progressively raising its temperature to a maximum of about 2093° F. to effectuate chemical and physical changes in the shaped mixture, disintegrating the reaction product into fine particles, processing the disintegrated particles to discard therefrom substantially all particles of a size greater than 44 microns and substantially all particles finer than one micron in excess of 15% to 20% of the total weight of the particles, making a ceramic suspension of the remaining particles in a carrier liquid under controlled viscosity conditions, forming a ceramic casting from the ceramic suspension within a mold walls of which are moisture absorbent, separating the casting from the mold, and sintering the casting by progressively raising its temperature to a maximum of about 2093° F.

31. A process for manufacturing ceramic articles, including the steps of producing a substantially uniform viscous mixture of 25% quartzite, 25% feldspar, 25% clay and 25% kaolin in a mixture liquid, dividing up the viscous mixture into relatively small portions to which are imparted any shape without any predetermined relation to the shape of any end product to be produced, reacting the shaped mixture by progressively raising its temperature to a maximum of about 2390° F. to effectuate chemical and physical changes in the shaped mixture, disintegration the reaction product into fine particles, processing the disintegrated particles to discard therefrom substantially all particles of a size greater than 44 microns and substantially all particles finer than one micron in excess of 15% to 20% of the total weight of the particles, making a ceramic suspension of the remaining particles in a carrier liquid under controlled viscosity conditions, forming a ceramic casting from the ceramic suspension within a mold walls of which are moisture absorbent, separating the casting from the mold, and sintering the casting by progressively raising its temperature to a maximum of about 2345° F.

32. The product of a process for manufacturing ceramic articles, the process including the steps of producing a substantially uniform viscous mixture of a plurality of ceramic materials including clay in a mixture liquid in proportions determined by a particular end product to be produced, dividing up the viscous into relatively small portions to which are imparted any shape without any particular relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, eliminating from the disintegrated particles all particles of a size outside certain predetermined limits, making a ceramic suspension of the particles within the predetermined limits in a carrier liquid under controlled viscosity conditions, forming a casting from the ceramic suspension between opposed mold faces one of which is previous to and an absorbent for the carrier liquid and the other is imprevious to and does not absorb the carrier liquid so that the ceramic particles deposit and build up substantially only on the pervious face, separating the casting from the mold, and sintering the casting at a temperature substantially below the reaction temperature.

33. The product of a process for manufacturing ceramic articles, the process including the steps of producing a substantially uniform viscous mixture of a plurality of ceramic materials including clay in a mixture liquid in proportions determined by a particular end product to be produced, dividing up the viscous mixture into relatively small portions to which are imparted any shape without any particular relation to the shape of any end product to be produced, reacting the shaped mixture by heating to a temperature of predetermined magnitude sufficient to carry to a desired end point effectuation of chemical and physical changes in the shaped mixture, disintegrating the reaction product into fine particles, forming a ceramic suspension of the disintegrated particles in a carrier liquid and producing a casting from the ceramic suspension between opposed mold faces one of which is pervious to and an absorbent for the carrier liquid and the other is impervious to and does not absorb the carrier liquid so that the ceramic particles deposit and build up substantially only on the pervious face, and thereafter sintering the casting thus formed at a temperature substantially below the reaction temperature.

34. The product of a process for manufacturing ceramic articles, the process including the steps of preparing a viscous ceramic suspension in a liquid carrier of ground ceramic materials which have been mixed and then reacted through a temperature range to a maximum temperature predetermined to complete certain physical and chemical changes in the mixed material, and then ground to a particle size within certain predetermined limits, forming a casting from the ceramic suspension between opposed mold faces one of which is pervious to and an absorbent for the carrier liquid and the other is impervious to and does not absorb the carrier liquid so that the ceramic particles deposit and build up substantially only on the pervious face, separating the casting from the mold, and sintering the casting at a temperature substantially below the reaction temperature.

References Cited

UNITED STATES PATENTS

| | | | |
|---|---|---|---|
| 2,106,039 | 1/1938 | Safford | 106—241 |
| 2,807,857 | 10/1957 | Murray et al. | |
| 1,462,396 | 7/1923 | Treischel | 106—46 |
| 2,045,318 | 6/1936 | Stribeck | 106—46 |
| 1,564,274 | 12/1925 | Rand. | |
| 1,679,345 | 8/1928 | Austin. | |
| 2,288,661 | 7/1942 | Wadman. | |
| 2,534,653 | 12/1950 | Austin | 264—312 X |
| 1,692,887 | 11/1928 | Casselman | 264—87 |
| 3,036,333 | 5/1962 | Sainty | 264—15 |
| 3,046,607 | 7/1962 | Blaha | 264—15 |
| 2,299,374 | 10/1942 | Bickford | 264—86 |
| 2,159,349 | 5/1939 | Bennett. | |
| 2,299,374 | 10/1942 | Bickford. | |

FOREIGN PATENTS

| | | |
|---|---|---|
| 465,922 | 5/1937 | Great Britain. |
| 117,857 | 12/1943 | Australia. |

ROBERT F. WHITE, Primary Examiner

J. R. THURLOW, Assistant Examiner

U.S. Cl. X.R.

25—129; 106—45, 46; 264—86

Disclaimer 3,533,812.—*Howard B. Cummings* and *Ralph Gibson*, New Castle, Pa. PROCESS FOR THE MANUFACTURE OF CERAMIC ARTICLES, AND PRODUCT DERIVED FROM SUCH PROCESS. Patent dated Oct. 13, 1970. Disclaimer filed Dec. 23, 1970, by the assignee, *Interpace Corporation*.

Hereby enters this disclaimer to claims 10, 24, 25 and 26 of said patent.
[*Official Gazette May 25, 1971.*]